July 11, 1933.                H. L. ALLAN                1,918,009
                           WAX SWEATING PLANT
                         Filed July 25, 1930            4 Sheets-Sheet 1

July 11, 1933. H. L. ALLAN 1,918,009
WAX SWEATING PLANT
Filed July 25, 1930 4 Sheets-Sheet 2
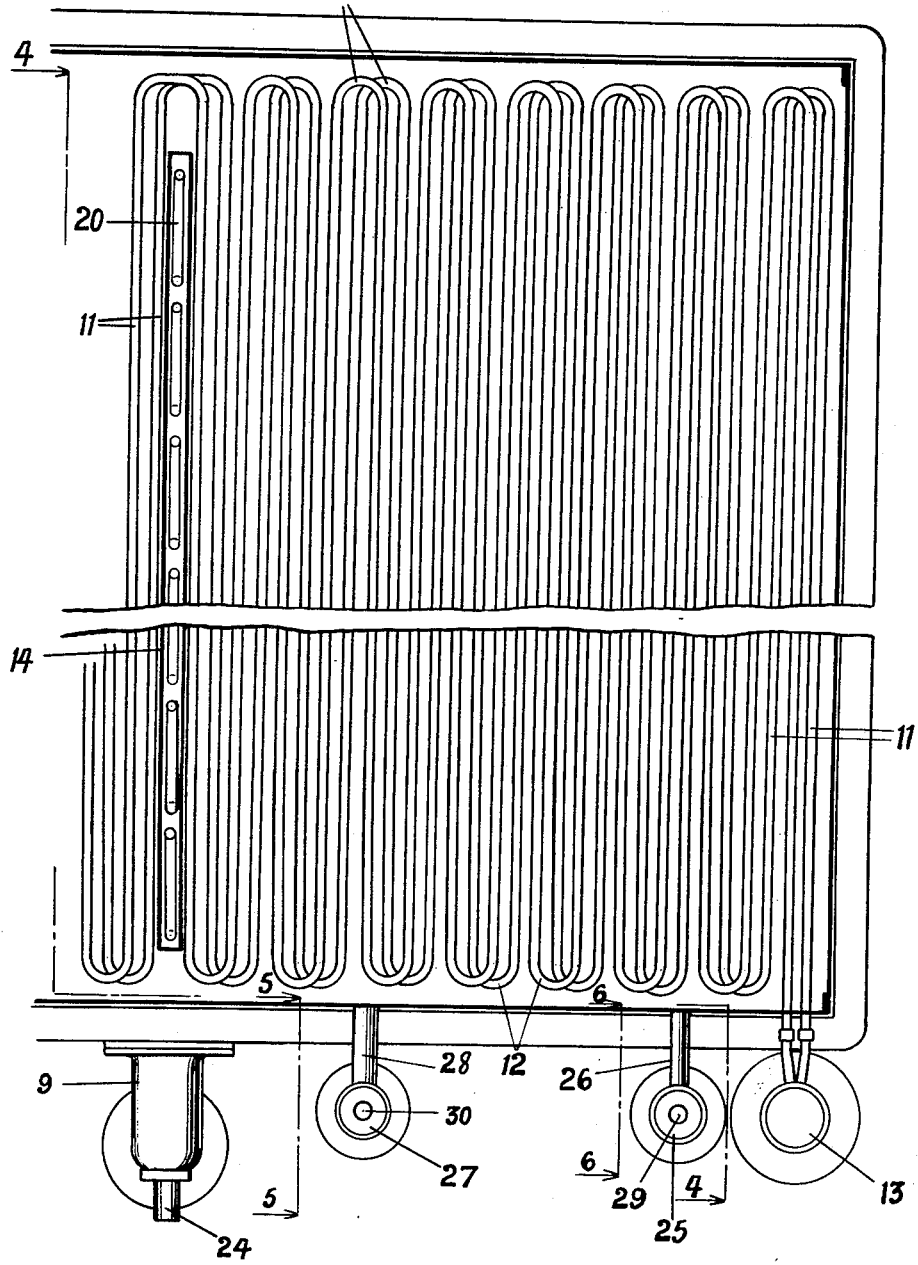

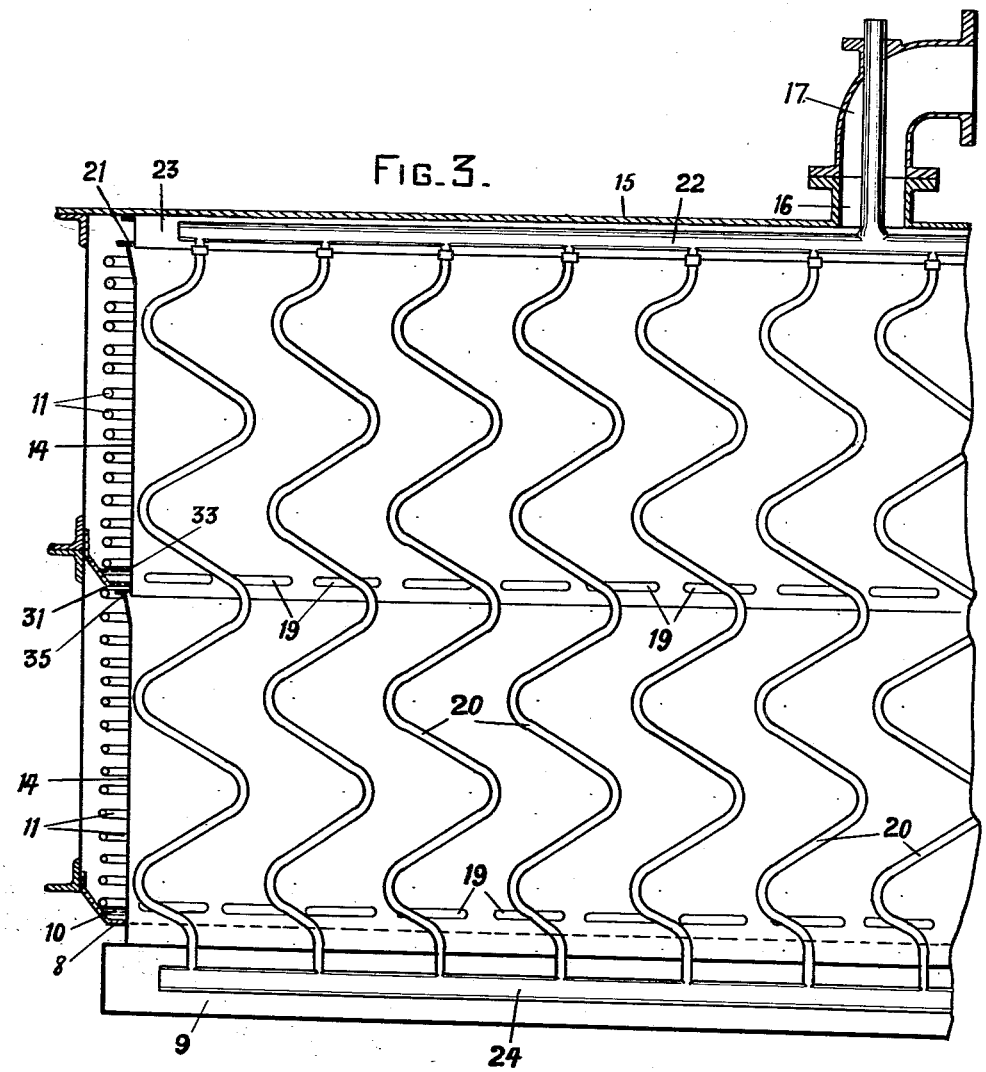

July 11, 1933.  H. L. ALLAN  1,918,009
WAX SWEATING PLANT
Filed July 25, 1930  4 Sheets-Sheet 4
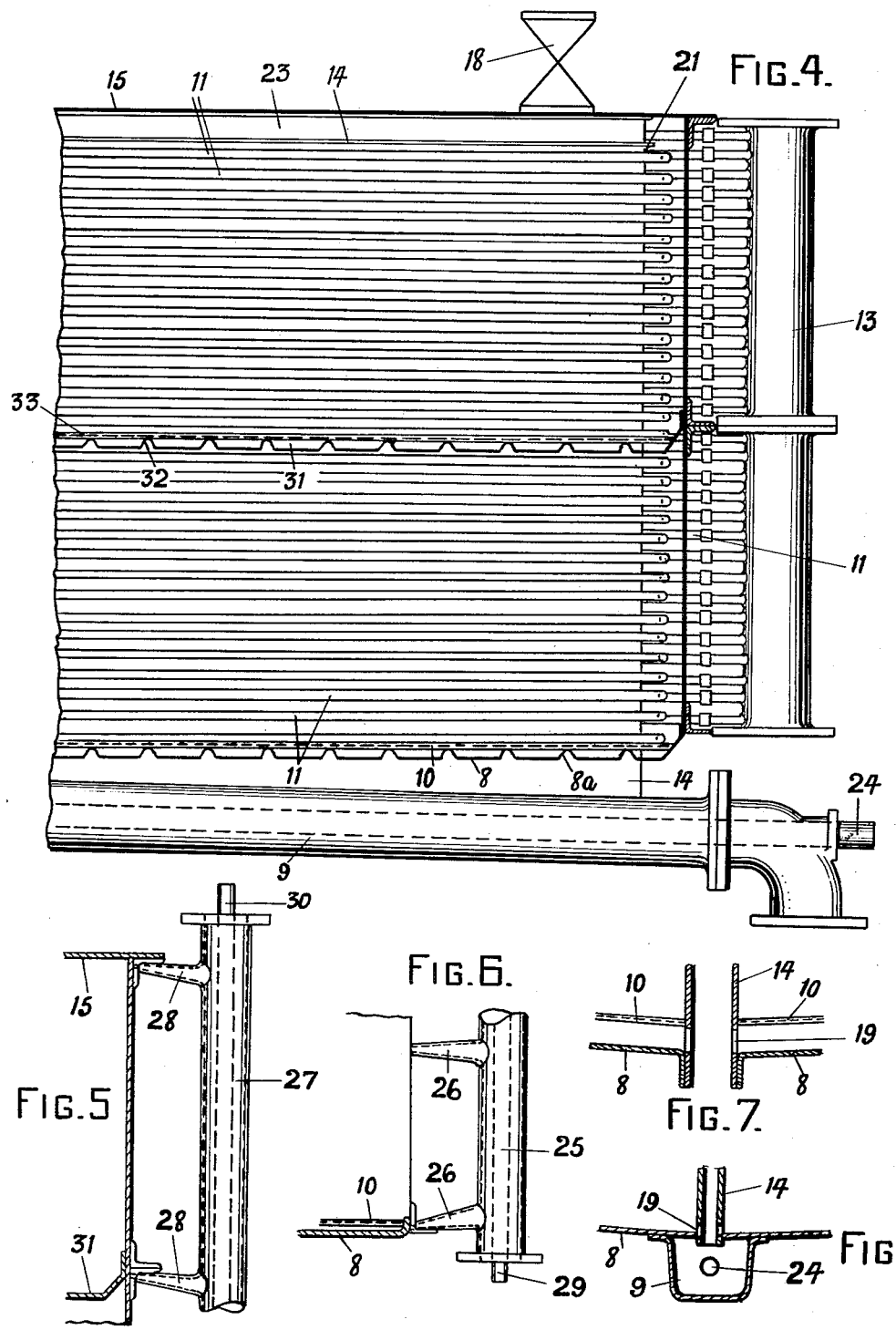

Patented July 11, 1933

1,918,009

UNITED STATES PATENT OFFICE

HUGH LOGIE ALLAN, OF SYRIAM, BURMAH, BRITISH INDIA, ASSIGNOR TO THE BURMAH OIL COMPANY LIMITED, OF GLASGOW, SCOTLAND, A CORPORATION OF GREAT BRITAIN

WAX SWEATING PLANT

Application filed July 25, 1930, Serial No. 470,639, and in Great Britain October 2, 1929.

This invention relates to apparatus for the heat treatment of wax and wax mixtures, comprising a vessel having means for charging the same with wax or wax mixture, which is supported within the vessel without the use of water as a wax support, means being provided for withdrawing successive portions of the mixture during the heat treatment, and means being also provided for uniformly heating or cooling the wax throughout the vessel.

Such apparatus is disclosed in the specifications of United States Patents Nos. 1,504,923 and 1,743,746, the latter patent disclosing the use of a series of transverse pipe coils through which a heating or cooling fluid is circulated, said pipe coils being spaced closely throughout the wax mass under treatment.

According to the present invention, in apparatus for the heat treatment of wax or wax mixture, comprising a wax containing vessel or chamber having means for supporting the wax or wax mixture therein without the use of water as a wax support, a multiplicity of transverse or horizontal pipes is arranged in superposed transverse rows in said vessel or chamber, said pipes being straight throughout or for the greater part of their length, and the pipes of each row are staggered in relation to the pipes of the subjacent and/or superjacent row of pipes.

The present invention contemplates the provision of a deep closed vessel of large capacity having its external walls insulated or lagged to enable the vessel to be used in the open for the heat treatment of wax or wax mixture, instead of being enclosed in a specially heated building as has been heretofore proposed.

The staggering of the pipes closely spaced throughout the mass of wax under treatment, not only leads to improved heat transference, but provides a more efficient support for the mass of wax during the sweating process.

The transverse or horizontal pipes of each row may be connected together at alternate ends to form a pipe of sinuous or serpentine form which is horizontally or substantially horizontally or transversely disposed, and be connected at their ends to inlet and outlet chambers common to the whole of the superposed rows of pipes or common to a group of superposed rows of pipes.

The present invention also contemplates the employment of a large rectangular covered or closed vessel having a reticulated support near the bottom thereof for supporting the wax without the use of water as a wax support, the vessel being equipped with a multiplicity of pipes arranged in superposed staggered rows as hereinbefore described.

If the wax containing vessel is completely closed, it may be equipped with means for controlling the admission and egress of air at will and with means for supercharging the vessel or chamber with wax or wax mixture to compensate for the shrinkage of the original charge which occurs during cooling.

The apparatus for the heat treatment of wax or wax mixture may consist of a single vessel or chamber of large capacity, preferably covered or closed, either for use within a heated building or for use in the open. Alternatively the apparatus may be of the known type comprising a closed upright vessel having partitions dividing it into a plurality of superposed wax containing compartments in which the wax is supported without the use of water as a wax support, and the present invention therefore further consists in providing the several superposed compartments of an apparatus of the type described with superposed rows of straight transverse pipes in each compartment, a heating or cooling fluid being circulated through the said pipes, which are closely spaced throughout the mass of wax in each compartment.

In order that the invention may be more clearly understood, reference is hereinafter made to the accompanying drawings which illustrate one construction of apparatus according to the invention.

Fig. 2 is a sectional plan view on the line 2—2 of Fig. 1.

Fig. 3 is a part sectional elevation at right angles to Fig. 1 and on the line 3—3 thereof.

Fig. 4 is a part sectional elevation on the line 4—4 of Fig. 2.

Fig. 5 is a part sectional view on the line 5—5 of Fig. 2 showing the air supply pipe.

Fig. 6 is a part sectional view on the line 6—6 of Fig. 2 showing the steam supply pipe.

Fig. 7 is an enlarged section illustrating the ports in the sides of the central duct.

Fig. 8 shows an alternative form of run-down channel.

Figure 1:
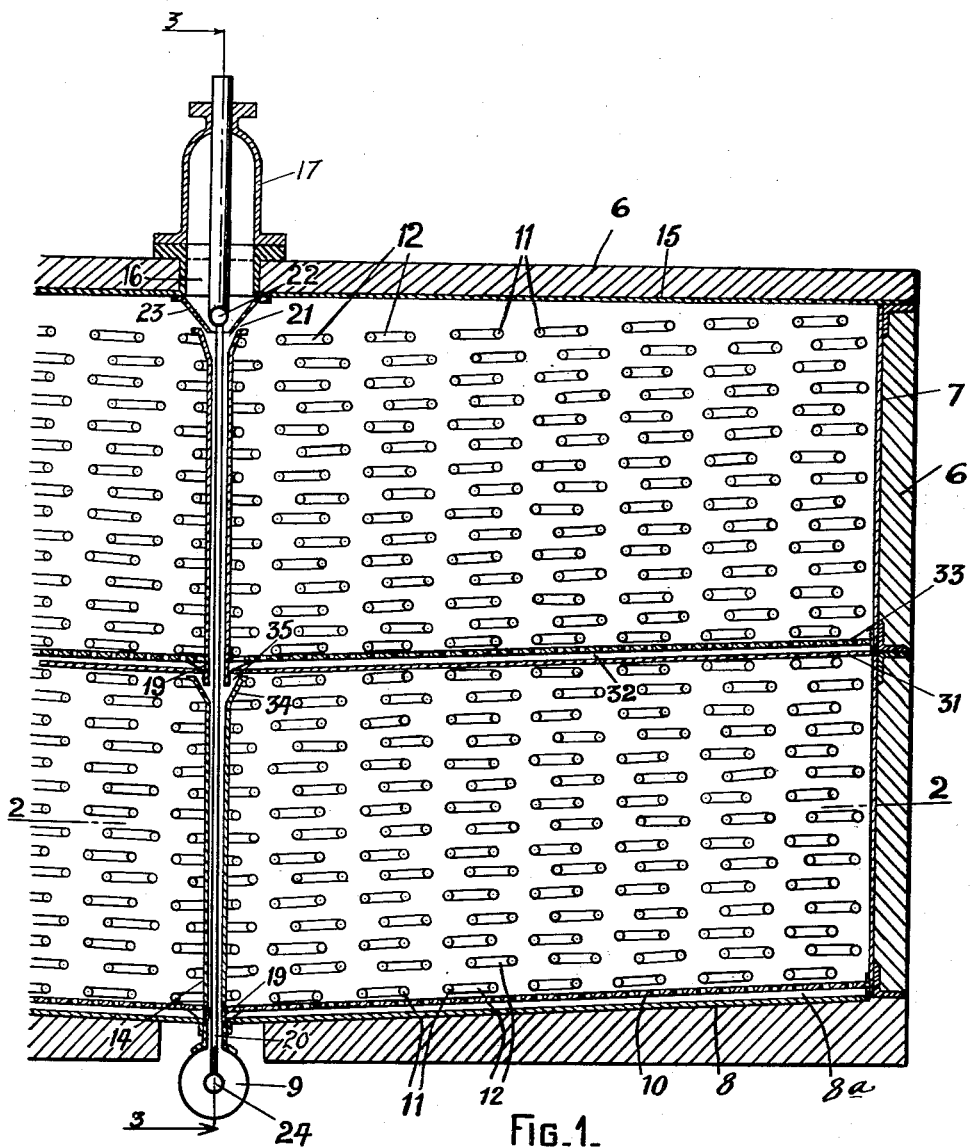
Fig. 1 is a vertical sectional elevation through part of the apparatus.

The apparatus shown consists of a single covered rectangular pan or vessel 7, the bottom 8 of which is dished or cambered downward at the centre towards a central channel 9 for the collection of liquefied wax or oil. The bottom 8 consists of steel plates stiffened by means of corrugations 8a (Fig. 4). Supported on the corrugations 8a or by other suitable means, just above the bottom plate, is a false bottom 10 of reticulated metal, metallic gauze or the like, forming a support for the mass of wax or wax mixture during the heat treatment. Above the false bottom 10 and disposed at a uniform vertical pitch of about two inches up to the top of the vessel are serpentine pipes 11, preferably of mild steel, composed in the main of straight lengths connected by short bends 12, each serpentine being substantially flat and horizontal. The sinuous pipe or serpentine 11 preferably extends completely across the vessel, being connected at one end to an inlet or outlet header 13 and at the other end to a similar header (not shown) for the circulating fluid.

The serpentines 11 are slightly cambered downward at the centre in such a manner as to become equivalent to U tubes, thereby ensuring complete expulsion of air. All serpentine pipes are of similar design and have adjacent straight portions parallel and of substantially uniform horizontal pitch equal to about four inches, but regarded in the plan view (Fig. 2) adjacent serpentines are staggered by approximately half of the said pitch in order that the assembly of pipes may provide support for the wax mass during heat-treatment.

Connected to the drain or run-off channel 9 provided at the centre of the bottom plate 8 of the vessel 7 and extending vertically upwards to a level slightly below the top of the vessel is a duct 14 preferably of rectangular form which serves the purposes of supporting and stiffening the bottom plate 8, introducing the charge of liquefied wax or wax mixture for treatment, and leading away the wax or oil after treatment.

The top cover 15 of the apparatus contains a central opening forming an inlet 16 to which is connected the charging pipe 17 for supplying the charge of wax or wax mixture to be treated, and the cover 15 carries also relief valves or other means 18 (Fig. 4) for relieving the apparatus of internal pressure exceeding a predetermined limit, as well as suitable valves (not shown) for controlling ingress of air when liquefied wax or oil is run off from the apparatus.

The duct 14 is provided below the wax support or false bottom 10 with slots or ports 19 (Figs. 3 and 7) through which the wax supplied to the duct 14 enters the surrounding vessel, and through which the oil or wax discharges from the vessel during the sweating operation, the bottom plate 8 being preferably flanged downwards at the centre and there welded to the duct 14.

Pipes or passages 20 (Fig. 3) are arranged within the duct 14 for circulation of heating fluid for the purpose of maintaining the wax or oil in the duct 14 in the liquid state when required. An overflow opening 21 (Fig. 3) is left between the upper end of this duct and the top of the stove whereby additional liquefied wax or wax mixture, introduced into the apparatus during or immediately after the cooling phase to compensate for the shrinkage of the original charge which occurs during cooling, may overflow into the surrounding vessel, this introduction of additional mixture being known as supercharging.

The steam pipes 20 (Fig. 3) within the duct 14 are provided for melting out the portion of solidified charge in the duct 14 before the sweating operation is commenced and are preferably of serpentine form as shown in Fig. 3, and are supplied with steam from a steam supply pipe 22 extending across the top of the chamber and within an elongated charging funnel 23 supplying the charge to the duct 14, the other end of the pipes 20 being connected to a central steam pipe 24 provided in the run-down channel 9 for melting the solidified wax in the channel before sweating.

A pipe 25 (Figs. 2 and 6) is provided for injecting steam or other heating fluid through a jet pipe 26 into the space between the bottom 8 of the vessel and the false bottom 10 and into the space above the false bottom, to facilitate melting out of the residual wax after heat-treatment. An air pipe 27 (Figs. 2 and 5) is also provided for allowing the air to escape from the vessel during filling, being provided with a branch pipe 28 which opens into the vessel near the top thereof.

A central steam pipe 29 (Figs. 2 and 6) extends through the steam pipe 25 for freeing the pipe of solidified wax which may be run off through a drain pipe connected to the bottom of the steam pipe 25. A similar central steam pipe 30 (Figs. 2 and 5) extends through the air pipe 27 for the same purpose.

The drain channel 9 may be in the form of a pipe as shown in Figs. 1, 3 and 4 or in the form of a channel provided with flanges for connecting it to the bottom plate 8 as shown in Fig. 8.

The apparatus may be constructed in the form of self-contained vessels as above described, and apparatus of large capacity may be formed of two or more such vessels superimposed. As shown, apparatus of large capacity may take the form of a single container or vessel of rectangular form subdivided into compartments thirty inches or more in depth, each vessel being substantially of the construction described, and divided into compartments by means of a division or diaphragm plate 31 provided with corrugations 32 similar to the bottom plates 8 for supporting a false bottom 33 of reticulated metal or the like. The plate 31 is provided at its outer edges with upturned flanges for connecting the edges to the outside plates of the vessel and the plate 31 is supported at its centre by means of flanges welded to the duct 14. The duct 14 is made in sections which discharge into a flared elongated funnel 34 formed at the top of the duct section immediately below the division or diaphragm plate 31 dividing the vessel into wax compartments. An overflow opening 35 is left between the top of the flared funnel 34 and the underside of the division or diaphragm plate 31 for supercharging the wax compartment below the division plate 31 when supercharging as hereinbefore described.

By the use of pipes straight throughout or for the greater part of their length air may be expelled during passage of the fluid, whereby internal corrosion of the piping is reduced to a minimum. The apparatus is particularly adapted for installing in the open without enclosure or protection by special building, but if preferred it may be installed inside a building of any known type or construction.

If installed in the open its external walls are insulated to retain the heat. The insulation is shown at 6 in Fig. 1 but has been omitted from Figs. 3-6.

I claim:

Apparatus for the heat treatment of wax or wax mixture comprising a covered vessel, transverse partitions dividing said vessel into superposed compartments, wax supports above the bottom of said vessel and above each partition, a multiplicity of heating or cooling fluid circulating pipes above each wax support, a series of superposed hollow vertical cells, one for each compartment, a drain passage along the underside of the bottom of said vessel and communicating with the bottom of the lowermost cell, an elongated funnel formed at the upper end of each cell, the lower end of each upper cell discharging into the funnel of its subjacent cell, a charging duct extending through the cover of the vessel and opening into the uppermost cell, openings in each cell below the wax supports, an overflow opening in each compartment at the upper end of each cell, and tubular heating elements vertically disposed within said cells.

HUGH LOGIE ALLAN.